Dec. 16, 1947.  A. F. BENNETT  2,432,716
DRIVING AND CONTROL MECHANISM
Filed July 13, 1943
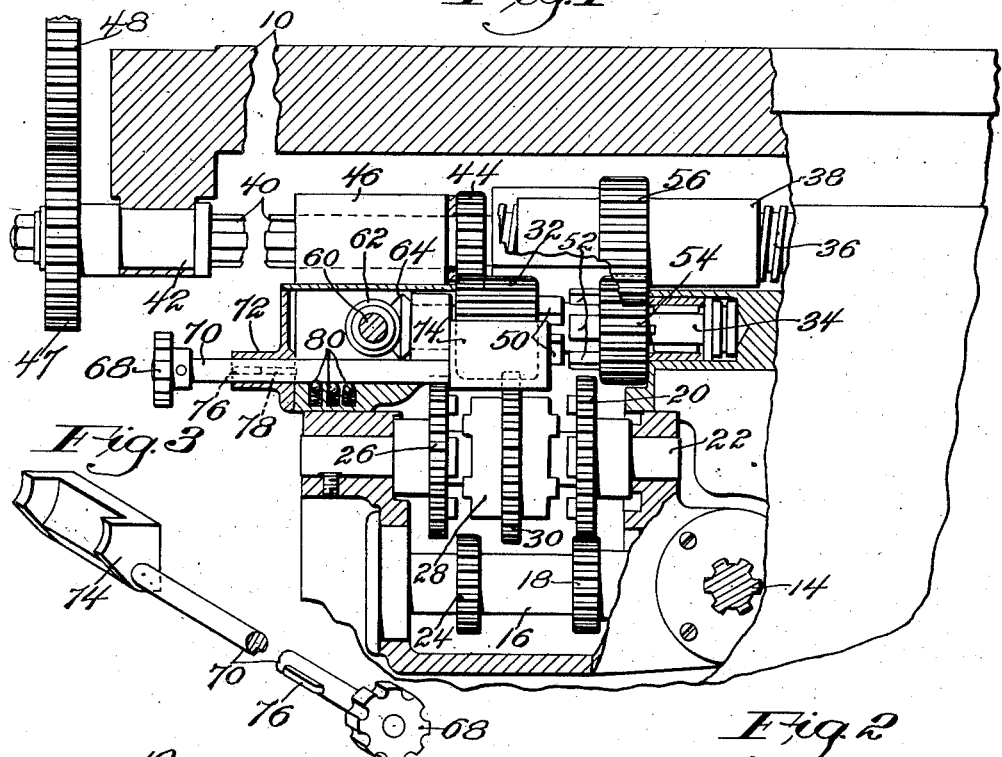
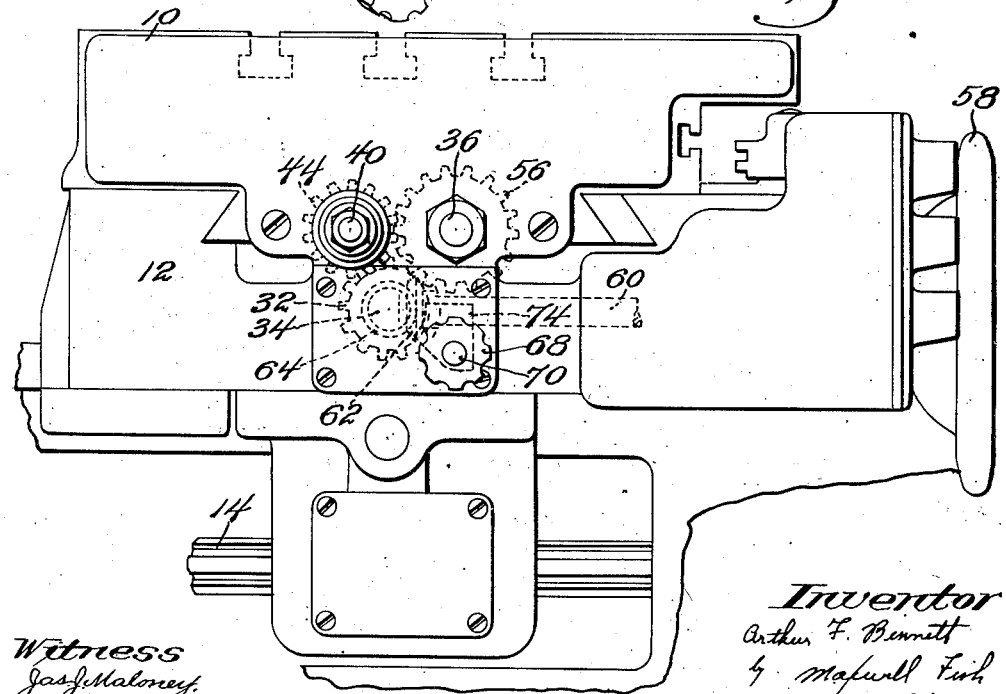

Patented Dec. 16, 1947

2,432,716

UNITED STATES PATENT OFFICE 2,432,716

DRIVING AND CONTROL MECHANISM

Arthur F. Bennett, West Barrington, R. I., assignor to Brown and Sharpe Manufacturing Company, a corporation of Rhode Island Application July 13, 1943, Serial No. 494,537

3 Claims. (Cl. 90—21)

The present invention relates to an improvement in driving and control mechanisms for machine tools, and more particularly to an improvement in the table and attachment drives and control mechanism therefor in a milling machine.

It is a principal object of the invention to provide a novel and improved driving and control mechanism for the table and attachment drive of a milling machine, which is simple in construction and operation, and is readily controlled by the operator to enable either or both of these drives to be coupled in driving relation.

With this and other objects in view as may hereinafter appear, a feature of the invention consists in the provision of a driving element which is readily shiftable from any one to another of three selected positions including an intermediate position in which both of the feed screw and nut connection and the attachment drive shaft are connected to be driven simultaneously, and alternatively available shifted positions in which only one of the screw and nut connection and the attachment drive shaft is connected to be driven thereby.

Further in accordance with the invention, a manually operable control element is provided having three alternative positions corresponding with those of the shiftable driving element above described for the convenience of the operator in setting up the machine for any particular operation.

The several features of the invention consist also in the devices, combinations and arrangement of parts hereinafter described and claimed, which together with the advantages to be obtained thereby will be readily understood by one skilled in the art from the following description taken in connection with the accompanying drawing, in which Fig. 1 is a detail sectional view in front elevation illustrating a portion of the work table of a milling machine, the saddle support for the same, and certain driving connections for reciprocating the table and for driving the attachment drive shaft associated therewith, only so much of the machine being illustrated as believed necessary to show the connection of the present invention therewith; Fig. 2 is a view in left side elevation of the work supporting table and saddle support shown in Fig. 1; and Fig. 3 is a perspective view of the control knob and shifting fork for controlling the driving connections.

The invention is specifically illustrated in the drawings as embodied in a milling machine of ordinary construction having a work supporting assembly including a longitudinally movable table 10 and a transversely movable saddle support 12. The power driving connections for the table include a spline shaft 14 which is connected through a sliding gear unit (not shown) with a horizontal shaft 16 on the saddle. A pinion 18 on shaft 16 meshes with a driving element 20 of a reversing clutch loosely supported on a pivot shaft 22. A pinion 24 on shaft 16 is connected through an intermediate gear (not shown) with a reverse driving element 26 on shaft 22. A driven clutch member 28 of the reversing clutch is loosely supported on shaft 22 between the reverse driving elements 20, 26, and is axially shiftable thereon from the intermediate position illustrated in Fig. 1, into clutching engagement with either of the driving elements 20, 26. A gear 30 formed on the clutch element 28 meshes with a clutch gear 32 which is loosely supported to turn and to move axially upon a power feed shaft 34 for the work supporting table 10. The clutch gear 32 as hereinafter more fully described, is shiftable to render either or both of the table and attachment drives operative.

In the preferred form of the invention illustrated in the drawing, the table 10 is driven by means of a screw and nut connection comprising a feed screw 36 of the non-rotatable type which extends along the length of and is rigidly fixed to the table, and a nut 38 which is rotatably supported on the saddle support 12 against axial movement with relation thereto. Inasmuch as this construction is well known in the art, details of the supporting structure for the screw 36 and nut 38 have been omitted. For the driving of any special attachments which may be supported on the table 10, an attachment drive shaft in the form of a spline shaft 40 is mounted on the table support in parallel relation to the feed screw 36. The shaft 40 extends along the length of the table, and is rotatably supported at its ends in bearings, one of which is illustrated at 42 in Fig. 1. Rotational movement is imparted to the attachment drive shaft 40 by means of a gear 44 splined on the shaft and externally supported against axial movement therewith in a bracket 46 on the saddle support 12. In Fig. 1 of the drawings is shown a gear 47 on shaft 40 and a gear 48 meshing therewith, which form part of a conventional gear train for driving an attachment (not shown) mounted on the table 10.

In accordance with the present invention, the driving control means for the table 10 is constructed and arranged to provide a simple and easily available shifting mechanism including a single manual control element which is shiftable to three different positions in which the table alone is connected in driving relation, in which the table feed screw and attachment shafts are both connected in driving relation, and in which the attachment shaft alone is connected in driving relation. The mechanism for shifting the driving connections from one to the other of these three positions, comprises the axially shiftable clutch gear 32 slidably supported on the power shaft 34. At one end the clutch gear is provided with elongated clutch teeth 50 arranged for engagement with correspondingly elongated clutch teeth 52 on a driving gear 54 which is secured to the power shaft 34 and meshes with a drive gear 56 on the feed screw nut 38. The clutch gear 32 is arranged also to mesh with the driving gear 44 on the attachment drive shaft 40.

For manual operation of the work supporting table 10, a table hand wheel 58 is provided at the front side of the machine in accordance with the usual practice. The hand wheel 58 is connected through clutching means which may be of ordinary description, not shown, to drive a hand wheel shaft 60 which is provided at its rear end with a bevel gear 62 meshing with a bevel gear 64 at the outer end of power shaft 34.

Further in accordance with the invention, a selector knob for controlling the position of the clutch gear 32 is provided having three positions in which the table and attachment drives are rendered selectively or simultaneously operative. The selector knob referred to, is designated at 68 formed on the outer end of an axially shiftable control rod 70 slidably mounted in a bearing 72 in the saddle support. A shifting fork 74 formed on the inner end of the control rod 70 is arranged for engagement with the clutch gear 32, and serves to control the position thereof axially of the power shaft 34. A spline 76 carried on the control rod 70 for engagement with a slot 78 in the bearing 72 serves to key the control rod and shifting fork 74 against rotational movement. In order to support the control rod 70 in each of its three alternative positions, three spring-pressed detent balls 80 are provided in a supporting bracket for the control rod 70 for engagement selectively with a recess in the control rod.

As will be evident from an inspection of Fig. 1 of the drawings, when the clutch gear 32 is in its extreme position to the left, it is in driving relation to the gear 44 on the attachment drive shaft 40, and the elongated teeth 50, 52 are disconnected so that the attachment drive shaft only is operative. When the clutch gear 32 is now moved to its extreme position to the right, the clutch teeth 50, 52 are in mesh to drive the gear 56 and feed screw nut 38, while the gear 32 is entirely disconnected from the attachment driving spline gear 44 so that the table only is connected in driving relation. For an intermediate position of the clutch gear 32, the clutch teeth 50, 52 will remain in meshing relation, and the gear 32 will at the same time be brought into meshing relation with the attachment shaft driving gear 44.

Inasmuch as the hand wheel drive from the table hand wheel 58 is taken directly from the hand wheel shaft 60 to the power driving shaft 34, and thence through gears 54 and 56 onto the driving nut 38, the position of the control knob 68 cannot affect the operation of the hand wheel 58 to move the table. However, in the intermediate position of the control knob 68 in which the clutch faces 50, 52 are engaged, connecting the clutch gear 32 with the gear 54, and in which the gear 32 is also meshed with the spline gear 44 of the attachment drive, the hand wheel 58 is effective to move the table 10, and at the same time to operate any attachment supported on the table in timed relation to the table movement.

It will be understood that the invention is not limited to the specific embodiment shown, and that various deviations may be made therefrom without departing from the spirit and scope of the appended claims.

What is claimed is:

1. In a machine tool having a longitudinally reciprocable support adapted for receiving thereon a power driven attachment, the combination of a feed screw and nut driving connection for reciprocating said support, an attachment drive shaft, said attachment drive shaft and feed screw and nut connection being supported in parallel relation on the support, and a driving and control mechanism comprising a feed shaft supported parallel with said screw and nut connection and attachment drive shaft, and driving means including a relatively stationary driven gear on the attachment drive shaft, a driven clutch element and gears connecting the feed shaft with the feed screw and nut connection, and a driving clutch gear loose on said feed shaft shiftable from an intermediate position in which the clutch gear is engaged with said driven gear and with said driven clutch element to alternate positions in which the clutch gear is engaged only with said driven gear and is engaged only with said driven clutch element, and means under the control of the operator for shifting said driving clutch gear.

2. In a machine tool having a longitudinally reciprocable support adapted for receiving therein a power driven attachment, the combination of a feed screw and nut driving connection for reciprocating said support, an attachment drive shaft, said attachment drive shaft and feed screw and nut connection being supported in parallel relation on the support, and a driving and control mechanism comprising a feed shaft supported parallel with said screw and nut connection and attachment drive shaft, and driving means including a relatively stationary driven gear on the attachment drive shaft, a driven clutch element and gears connecting the feed shaft with the feed screw and nut connection, and a driving clutch gear loose on the feed shaft shiftable from an intermediate position in which the clutch gear is engaged with said driven gear and with said driven clutch element to alternate positions in which the driven gear and the driven clutch element alternatively are so engaged, and a hand wheel and connections therefrom for manually rotating the feed shaft, and a manually operable control element for controlling the position of said clutch gear having three positions corresponding with the three alternative positions of said clutch gear.

3. In a machine tool having a longitudinally reciprocable support, driving means for the support comprising a screw and nut driving connection, a feed shaft from which the drive is taken to said screw and nut connection supported parallel therewith, and an auxiliary attachment driving shaft parallel with said feed shaft, and control means including a driven element co-axial with and connected to drive the screw and nut connection, a second driven element co-axial with and connected to drive the attachment shaft and a driving element on the feed shaft, said driving and driven elements being relatively shiftable, and a three-position manual control member connected for effecting relative shifting movement of said driving and driven elements arranged in the three alternative positions selectively to drive the feed screw and nut connection only, to drive the attachment shaft only, and to drive both of said feed screw and nut connection and attachment shaft simultaneously.

ARTHUR F. BENNETT.

REFERENCES CITED

The following references are of record in the file of this patent:

UNITED STATES PATENTS

| Number | Name | Date |
| --- | --- | --- |
| 2,045,685 | Archea | June 30, 1936 |
| 2,158,483 | Peterson | May 16, 1939 |
| 2,094,484 | Bennett | Sept. 28, 1937 |